(12) United States Patent
Ayadiuno et al.

(10) Patent No.: US 11,579,321 B2
(45) Date of Patent: Feb. 14, 2023

(54) METHOD FOR CHARACTERIZING AZIMUTHAL ANISOTROPY USING CROSS-DIPOLE SONIC DATA

(71) Applicant: SAUDI ARABIAN OIL COMPANY, Dhahran (SA)

(72) Inventors: Christopher B. Ayadiuno, Dhahran (SA); Xuekai Sun, Beijing (CN); Wei Li, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 287 days.

(21) Appl. No.: 17/085,216

(22) Filed: Oct. 30, 2020

(65) Prior Publication Data

US 2022/0137246 A1 May 5, 2022

(51) Int. Cl.
*G01V 1/28* (2006.01)
*E21B 47/0224* (2012.01)
*G01V 1/34* (2006.01)
*G01V 1/48* (2006.01)

(52) U.S. Cl.
CPC .......... *G01V 1/284* (2013.01); *E21B 47/0224* (2020.05); *G01V 1/34* (2013.01); *G01V 1/48* (2013.01)

(58) Field of Classification Search
CPC . G01V 1/284; G01V 1/34; G01V 1/48; G01V 1/50; E21B 47/0224
See application file for complete search history.

(56) References Cited

U.S. PATENT DOCUMENTS

| | | | |
|---|---|---|---|
| 4,414,656 A | 11/1983 | Hepp | |
| 4,933,913 A | 6/1990 | Thomsen | |
| 7,035,165 B2 | 4/2006 | Tang | |
| 8,120,991 B2 | 2/2012 | Koren et al. | |
| 9,063,251 B2 | 6/2015 | Moos | |
| 9,207,342 B2 * | 12/2015 | Ball | G01V 1/284 |
| 2013/0235693 A1 * | 9/2013 | Ball | G01V 1/284 |
| | | | 367/31 |
| 2018/0065019 A1 * | 3/2018 | Shibuya | G16H 20/30 |

(Continued)

FOREIGN PATENT DOCUMENTS

| | | | |
|---|---|---|---|
| WO | 2013134032 A1 | 9/2013 | |
| WO | 2016205608 A1 | 12/2016 | |
| WO | WO-2022094201 A1 * | 5/2022 | ......... E21B 47/0224 |

OTHER PUBLICATIONS

International Search Report and Written Opinion issued in Application No. PCT/US2021/057233, dated Feb. 14, 2022 (10 pages).

(Continued)

*Primary Examiner* — Daniel Pihulic
(74) *Attorney, Agent, or Firm* — Osha Bergman Watanabe & Burton LLP (57) ABSTRACT

A method of realizing an shear wave propagation velocity anisotropy characterization within a display for a wellbore region including, obtaining a shear wave propagation velocity anisotropy intensity, and a shear wave propagation velocity anisotropy azimuth. A directional line segment is determined to represent the anisotropy for each of a plurality of measured depth points along the wellbore, and plotted on the display as a plurality of directional line segments to produce a 1-dimensional anisotropy characterization plot.

20 Claims, 6 Drawing Sheets

(56) References Cited

U.S. PATENT DOCUMENTS

| | | | |
|---|---|---|---|
| 2019/0369279 A1 | 12/2019 | Roure | |
| 2022/0137246 A1* | 5/2022 | Ayadiuno | G01V 1/50 367/86 |
| 2022/0229202 A1* | 7/2022 | Sun | G01V 1/305 |

OTHER PUBLICATIONS

N. L. Boness and M. D. Zoback; "A multiscale study of the mechanisms controlling shear velocity anisotropy in the San Andreas Fault Observatory at Depth", Geophysics; vol. 71; No. 5; Sep. 2006; pp. F131-F146 (16 pages).

Close, D. et al., "The Sound of Sonic: A Historical Perspective and Introduction to Acoustic Logging", CSEG Recorder, May 2009, pp. 34-43 (10 pages).

Kozak, Marek et al., "Azimuthal Shear Wave Anisotropy Analsis, Guided in Time Domain", SPWLA 55th Annual Logging Symposium, Society May 2014 (13 pages).

Alford, R.M. "Shear Data in the Presence of Azimuthal Anisotropy: Dilley, Texas", Seismic 9.6, SEG Technical Program Expanded Abstracts 1986, Society of Exploration Geophysicists, Jan. 1986, pp. 476-479 (4 pages).

Tang, Xiaoming and Raghu K. Chunduru, "Simultaneous inversion of formation shear-wave anisotropy parameters from cross-dipole acoustic-array waveform data", Geophysics, Society of Exploration Geophysicists, vol. 64, No. 5, Sep. 1999, pp. 1502-1511 (10 pages).

Tang, X.M. and D. Patterson, "Shear Wave Anisotropy Measurement Using Cross-dipole Acoustic Logging: An Overview", Petrophysics, Society of Professional Well Log Analysts, vol. 42, No. 2, Mar. 2001, pp. 107-117 (11 pages).

Zheng, Yibing et al., "Identifying Stress-Induced Anisotropy and Stress Direction Using Cross-Dipole Acoustic Logging", SPWLA 50th Annual Logging Symposium, Society of Petrophysicists and Well Log Analysts, Jun. 2009 (11 pages).

Market, Jennifer and Joanne Tudge, "A Layman's Guide to Acoustic Anisotropy", SPWLA 58th Annual Logging Symposium, Society of Petrophysicists and Well Log Analysts, Jun. 2017 (25 pages).

Kirkby, A. et al., "Mapping fractures using 1D anisotropy modelling of magnetotelluric data: a case study from the Otway Basin, Victoria, Australia", Geophysical Journal International, Oxford University Press, The Royal Astronomical Society, vol. 201, May 2015, pp. 1961-1976 (16 pages).

Franco, J.L. Arroyo et al., "Sonic Investigations in and Around the Borehole", Oilfield Review, 2006, pp. 14-33 (20 pages).

Tao, Guo et al., "Multi-scale analysis for azimuthal anisotropy of reservoir rocks from cross-dipole logs", Journal of Geophysics and Engineering, Institute of Physics Publishing, Nanjing Institute of Geophysical Prospecting, vol. 3, Apr. 2006, pp. 135-142 (8 pages).

* cited by examiner

METHOD FOR CHARACTERIZING AZIMUTHAL ANISOTROPY USING CROSS-DIPOLE SONIC DATA

BACKGROUND

Sonic logs are commonly acquired wellbores drilled in the oil and gas industry. They may be used to determine geological stress directions, the orientations of micro-fractures, and to calibrate seismic wave propagation velocity models used in seismic imaging. The velocity of propagation of sonic, and seismic, waves may vary as a function of position within the earth, and also as a function of propagation direction, and polarization angle orientation. The variation of propagation velocity with respect to propagation direction, and polarization angle is called anisotropy, and rocks which exhibit variation of propagation velocity with respect to propagation direction, and polarization angle are called anisotropic.

Figure 1A:
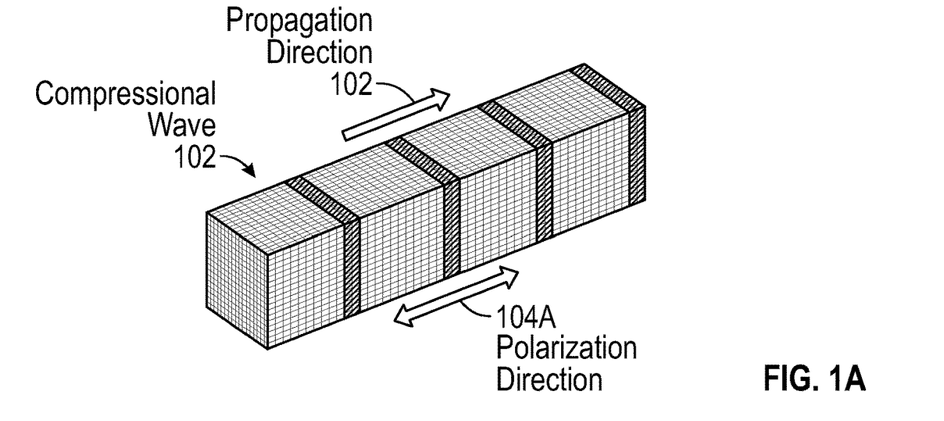
FIGS. 1A, 1B, and 1C show an example of elastic wave polarization.
Figure 1B:
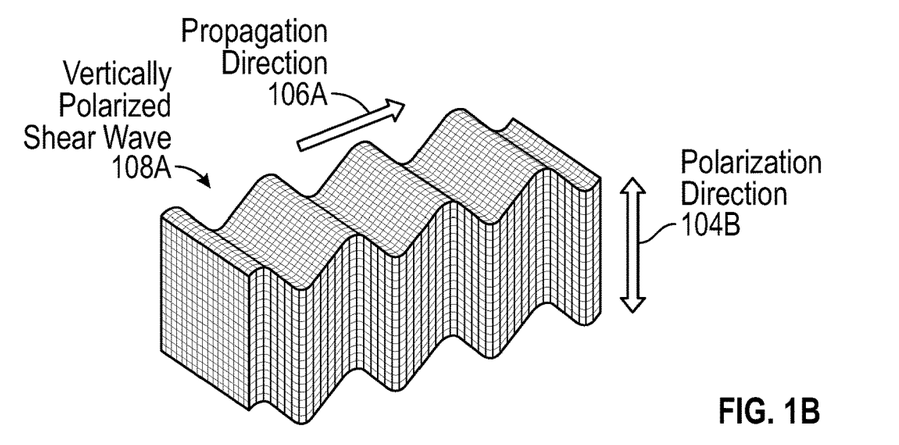
Figure 1C:
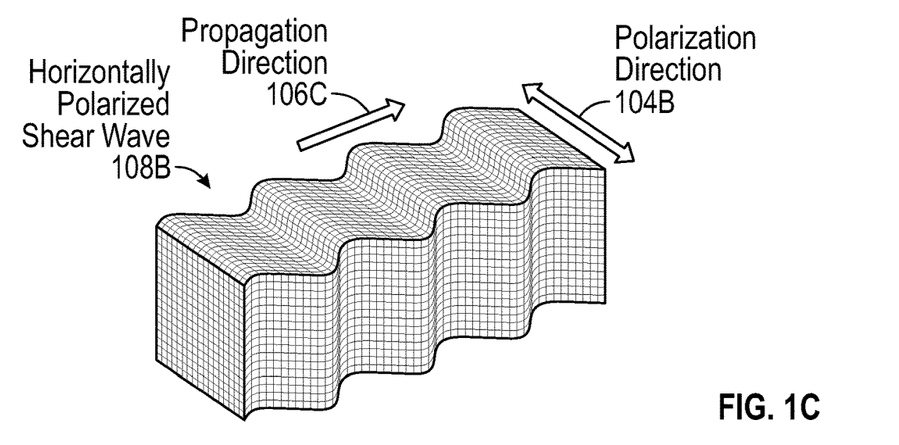

FIG. 1 show the varieties of wave propagation that occur in elastic materials such as rocks. FIG. 1A shows compressional waves (102) whose direction of particle motion, "polarization," (104A) aligns, or nearly aligns, with the direction of wave propagation (106A). FIGS. 1B and 1C show shear waves (108A, 108B). Shear waves have polarizations (104B, 104C) which are orthogonal, or nearly orthogonal, to their direction of propagation (106B, 106C). Unlike compressional waves, there may be two shear waves propagating in the same direction with polarization orthogonal to one another. Both compressional and shear waves may exhibit anisotropy.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of realizing an shear wave propagation velocity anisotropy characterization within a display for a wellbore region including, obtaining a shear wave propagation velocity anisotropy intensity, and a shear wave propagation velocity anisotropy azimuth. A directional line segment is determined to represent the anisotropy for each of a plurality of measured depth points along the wellbore, and plotted on the display as a plurality of directional line segments to produce a 1-dimensional anisotropy characterization plot.

In general, in one aspect, embodiments relate to a non-transitory computer readable medium storing instructions executable by a computer processor. The instructions include functionality for obtaining an shear wave propagation velocity anisotropy intensity, and an shear wave propagation velocity anisotropy azimuth. Further the instructions include functionality for determining a directional line segment to represent the anisotropy for each of a plurality of measured depth points along the wellbore, and plotting on the display a plurality of directional line segments to produce an anisotropy characterization plot.

Other aspects and advantages of the claimed subject matter will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure are directed to a method for characterizing azimuthal anisotropy using cross dipole sonic data. Two shear waves with orthogonal polarizations may propagate at different propagation velocities in anisotropic materials, such as rocks. One important characteristic of anisotropic rocks may be the difference between the speed at which the shear waves propagate. This difference may be called the anisotropic intensity. Another important characteristic of anisotropic rocks may be the polarization angle of the shear waves. This angle may be called the anisotropic azimuth. The anisotropic azimuth lies between 0 degrees and 180 degrees. Anisotropic azimuth has a 180 degree symmetry. For example, the anisotropic intensity for an anisotropy azimuth of 210 degrees is identical to anisotropic intensity for an anisotropic azimuth of 30 degrees. Although there may be two shear waves with different polarizations the polarizations are always orthogonal, hence a single angle, such as the angle between the polarization of the shear wave with the fastest velocity and a reference direction at the earth's surface may be enough to characterize the anisotropy azimuth.

Sonic logging tools commonly have sonic sources in the form of orthogonal dipoles which may excite orthogonally polarized shear waves. Sonic logging tools commonly have sonic receivers in the form of orthogonal dipoles which can receive orthogonally polarized shear waves from a plurality of sonic source dipoles. Such sonic logging tools are commonly called cross-dipole sonic tools, and the data recorded by them are commonly called cross-dipole sonic data.

In one or more embodiments, an anisotropic property is represented by a line at each measured depth along a borehole. The slope of the line corresponds to the anisotropic azimuth or fast shear azimuth (FSA) and its length represents anisotropy intensity. By repeating the same procedure for all depths along the wellbore, a new plot is obtained as a new way for characterizing anisotropy. In one or more embodiments, this disclosure provides a method for simultaneous characterization of anisotropy intensity and azimuth of near wellbore region within a 1D plot. Compared to conventional anisotropy maps, this method provides a meaningful and intuitive proxy for characterizing and understanding subsurface geological/petrophysical anisotropic features such as stress and fracture location and direction along the wellbore.

Herein, display means both a representation printed on paper, microfilm, or other printable material, and a representation using a digital medium such as a computer monitor, a laptop monitor, a workstation monitor, a television screen, or projected in a transitory manner, whether in a digital or an analogue manner, onto a screen.

Figure 2:
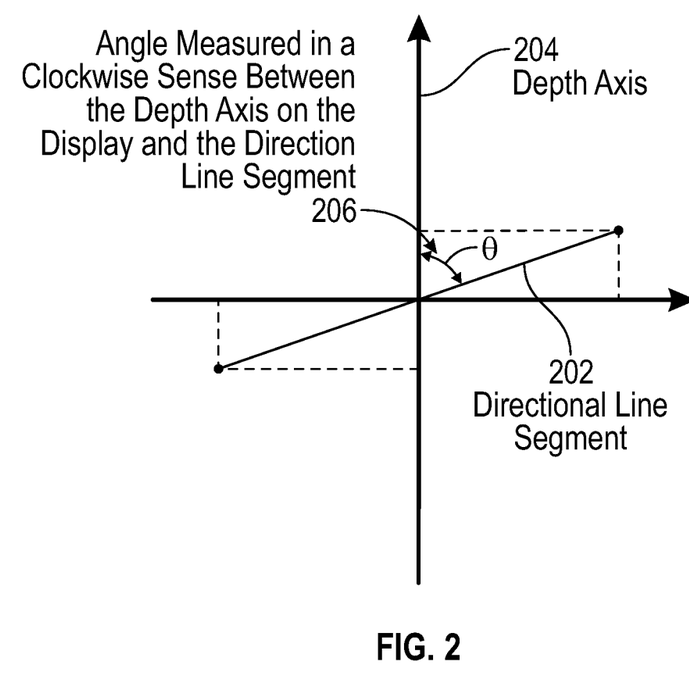
FIG. 2 shows an azimuthal system definition and line segment in accordance with one or more embodiments.

FIG. 2 shows an embodiment that represents each anisotropy intensity and anisotropy azimuth doublet as a direction line segment (202) on a display. In one or more embodiments, the length of the directional line segment (202) is monotonically related to the value of the anisotropy intensity such that a small value of anisotropy intensity corresponds to a short directional line segment (202), and a large value of anisotropy intensity corresponds to a long directional line segment (202). In some embodiments, the anisotropy intensity is proportional to the length of the directional line segment, such that a first anisotropy intensity that is twice as large as a second anisotropy intensity is represented by a directional line segment (202) that is twice as long as the directional line segment (202) representing the second anisotropy intensity. In other embodiments, the relationship between the anisotropy intensity and the length of the directional line segment (202) may not be proportional, for example it may be quadratic, or logarithmic, or have still other mathematical functional form.

In some embodiments, the orientation of the directional line segment (202) measured with respect to a reference direction on the display is equal to the anisotropy azimuth measured with respect to a reference direction on the earth's surface. For example, in some embodiments, the angle (206) measured in a clockwise sense between the depth axis (204) on the display and the direction line segment (202) may be equal to the anisotropy azimuth measured in a clockwise sense from the true North direction. In other embodiments, the anisotropy azimuth may be measured in a clockwise direction from magnetic North at the wellbore location. In alternative embodiments, the reference direction on the display may be chosen to be orthogonal to the depth axis (204). With respect to FIG. 2, the reference North direction is defined, and whether the azimuth increases clockwise or counterclockwise is also specified. In embodiments disclosed herein, the positive vertical direction is taken as the North direction, and the azimuth increases in a clockwise manner. FIG. 2 shows the azimuthal system definition, in which the North (vertical y-axis) and East (horizontal x-axis) directions fall at azimuthal angle of 0 and pi/2 (in radian), respectively.

One of ordinary skill in the art can readily appreciate still other reference directions on the earth's surface from which to measure the anisotropy azimuth and still other directions on the display from which to plot the directional line segment (202).

Figure 3A:
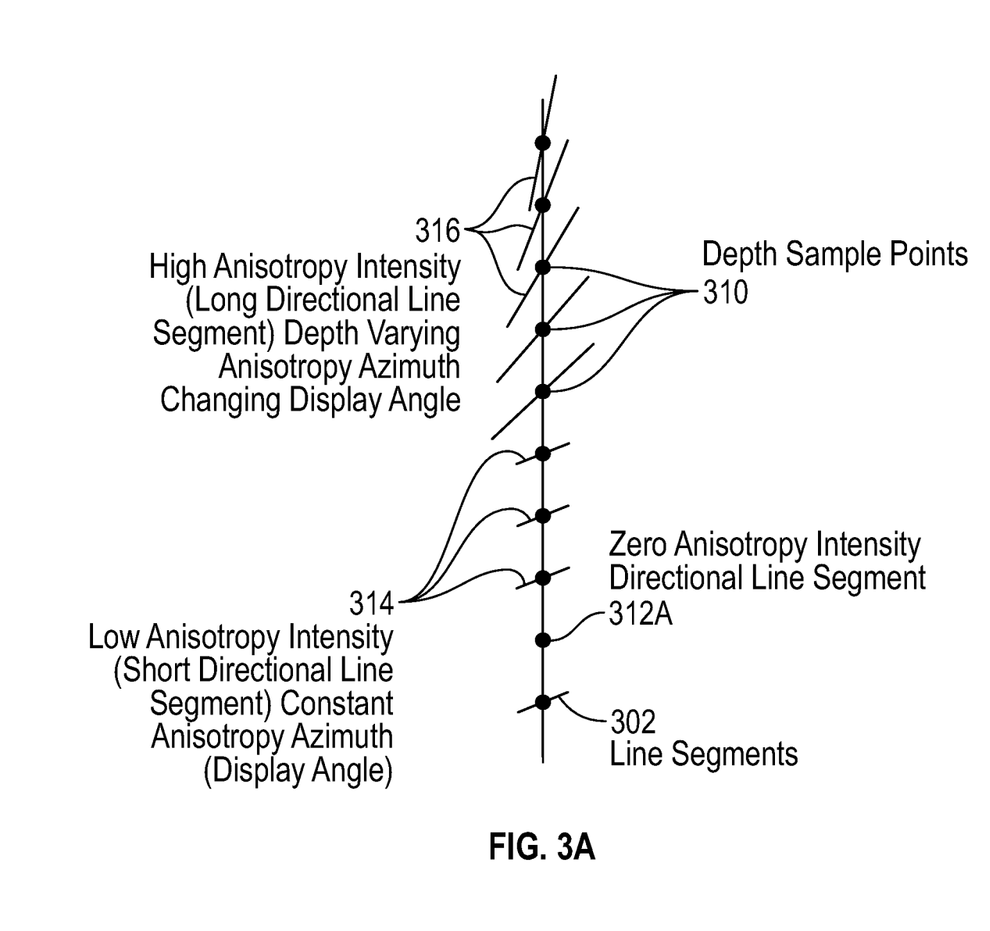
FIGS. 3A and 3B show anisotropy displays in accordance with one or more embodiments.
Figure 3B:
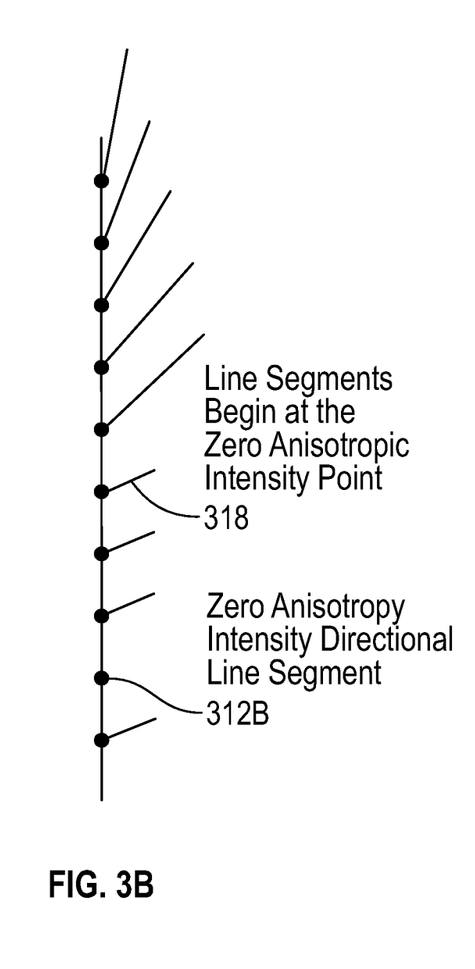

FIGS. 3A and 3B show a plurality of directional line segments (302) corresponding to a plurality of anisotropic intensity and anisotropy azimuth doublets measured at a plurality of depth sample points (310) along a wellbore. FIG. 3A shows directional line segments (302) displayed according to some embodiments, with the directional line segments (302) extending symmetrically on either side of the point designated as the zero anisotropy intensity point (312A). Some of the plurality of directional line segments (314) are short and are plotted at a constant display angle and correspond to low anisotropy intensity, and constant anisotropy azimuth. Others of the plurality of directional line segments (316) have long directional line segments and varying display angles, and correspond to high anisotropy intensity and varying anisotropy azimuth.

FIG. 3B shows an embodiment where the plurality of directional line segments (318) are displayed asymmetrically about the point designated as the zero anisotropy intensity point (312B). In some embodiments, one end of the directional line segment is collocated with the zero anisotropy intensity point (312B). In other embodiments, other asymmetrical arrangements of the directional line segment about the zero anisotropy intensity point (312B) may be used.

Figure 4:
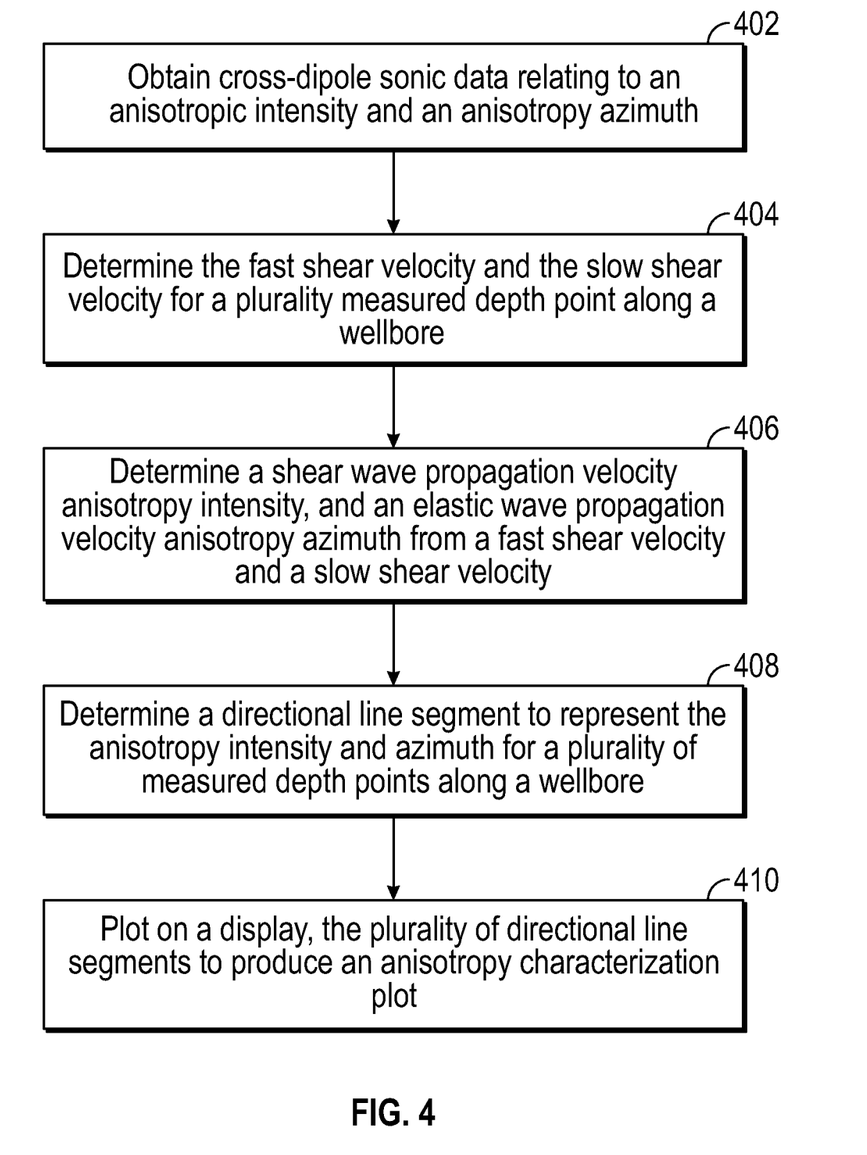
FIG. 4 shows a flowchart in accordance with one or more embodiments.

FIG. 4 shows a flowchart in accordance with one or more embodiments. In Block 402, cross-dipole sonic data relating to an anisotropy intensity and an anisotropy azimuth at a plurality of points is obtained. The anisotropy intensity and an anisotropy azimuth at a plurality of points may be obtained from a database, or directly from the sonic logging tool or from another source. More specifically, in one or more embodiments, inputs to the method of FIG. 4 are anisotropy intensity and anisotropy azimuth. Anisotropy intensity is obtained from the difference between the fast shear slowness and slow shear slowness (measured in percentage). To further suppress the noise influence or inaccurate estimates, anisotropy intensity is smoothened. In one or more embodiments, an effective range for anisotropy azimuth should be $[0-\pi]$.

In Block 404, a fast shear wave velocity and a slow shear wave velocity may be determined together with the corresponding polarization directions of the fast and slow shear waves for a plurality of measured depth points along the wellbore.

In Block 406, the anisotropy intensity may be calculated from the difference between the value of the fast shear wave velocity and the value of the slow shear wave velocity. In some embodiments, the anisotropy intensity may be calculated by subtracting the value of the slow shear wave velocity and the value of the fast shear wave velocity. In other embodiments the anisotropy intensity may be calculated using a different mathematical function. For example, it may be determined as the square, or logarithm, of the difference between the value of the fast shear wave velocity and the value of the slow shear wave velocity.

In Block 408, the directional line segment is determined in accordance with one or more embodiments. In some embodiments, the length of the directional line segment is monotonically related to the value of the anisotropy intensity. For example, in some embodiments, the anisotropy intensity is proportional to the length of the directional line segment. In other embodiments, the relationship between the anisotropy intensity and the length of the directional line segment may take a different mathematical for, for example the length of the directional line segment may be related to the square of the anisotropy intensity, or the length of the directional line segment may be related to the logarithm of the anisotropy intensity.

In still other embodiments the anisotropy intensity may be determined in Block 408 by dividing the difference between the fast shear wave velocity and the slow shear wave velocity by the sum of the fast shear wave velocity and the slow shear wave velocity.

Furthermore in Block 408, in accordance with some embodiments, the angle may be determined at which the directional line segment is plotted on the display. In some embodiments, the orientation of the directional line segment measured with respect to a reference direction on the display is equal to the anisotropy azimuth measured with respect to a reference direction on the earth's surface. For example, in some embodiments, the angle measured in a clockwise sense between the depth axis on the display and the direction line segment may be equal to the anisotropy azimuth measured in a clockwise sense from the true North direction. Thus, the beginning coordinates of the direction line segment on the display may be given by:

$$(x_1, z_1) = (-L \sin \theta, -L \cos \theta + z_D), \quad \text{Equation (1)}$$

and the ending coordinates of the directional line segment on the display may be given by:

$$(x_2, z_2) = (L \sin \theta, L \cos \theta + z_D), \quad \text{Equation (2)}$$

where L is the anisotropy intensity, and $\theta$ is the anisotropic azimuth measured clockwise from true North on the earth's surface and plotted clockwise from the depth axis direction on the display. $z_D$ is the location on the depth axis of the display corresponding to the depth of the sample point.

In other embodiments, other reference directions on the earth's surface, for example magnetic North at the wellbore location may be used. In other embodiments, the reference direction on the display may be chosen to be orthogonal to the depth axis.

Figure 5:
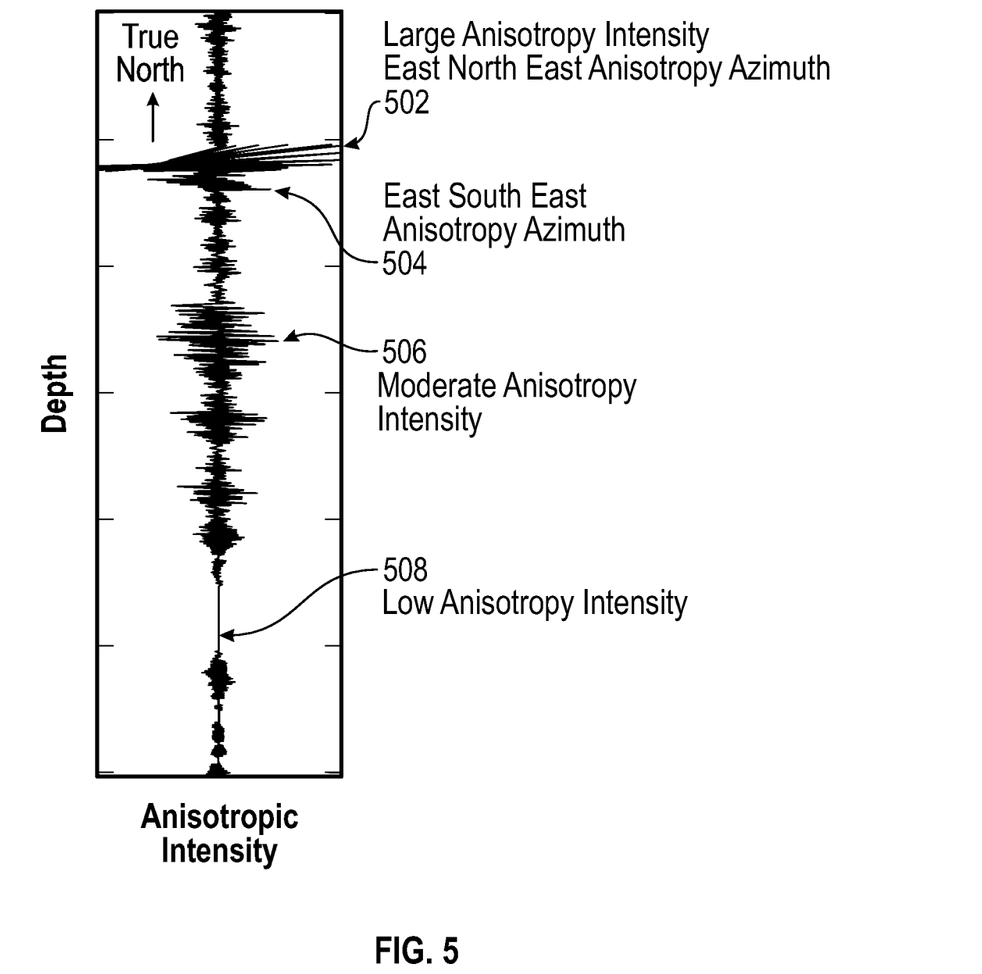
FIG. 5 shows an example of an anisotropy display in accordance with one or more embodiments.

In Block 410, in accordance with one or more embodiments, a plurality of directional line segments may be plotted on the display. That is, Step 408 is repeated for all the depth range available in the borehole. Putting the coordinate origin of each line segment at its corresponding measured depth produce a new anisotropy characterization plot as shown in FIG. 5 below. Each directional line segment may correspond to an anisotropy intensity and an anisotropy azimuth doublet measured at a depth sample point and the directional line segment may be plotted on the display so that the direct line segment intersects the depth axis of the display at the point representing the depth sample point. In some embodiments, the direction line segment may be symmetrically disposed about the depth axis. In other embodiment, the direction line segment may be asymmetrically disposed about the depth axis.

FIG. 5 shows an example of a plurality of anisotropy intensity and anisotropy azimuth doublets measured for a plurality of depth sample points plotted on a display, in accordance with one or more embodiments. The directional line segments are arranged symmetrically about the zero anisotropic intensity line and the direction of the depth axis is taken as the reference direction of the display, and true North as the reference direction on the earth's surface, for the measurement of anisotropic azimuth. The top of the display shows a region of high anisotropy intensity and East-North-East anisotropy azimuth (502). Immediately, below (502) is a segment of the wellbore with moderate anisotropy intensity and East-South-East anisotropy intensity (504). Below (504) is a long segment of wellbore with moderate anisotropy intensity (506). The bottom of the display shows a region of low anisotropy intensity (508).

As shown in FIG. 5, representing anisotropy properties simultaneously in a single 1-dimensional plot can create a new perspective that simplifies the interpretation of formation anisotropy and greatly facilitates anisotropy evaluation and comparison. The plot shown in FIG. 5 represents the subsurface anisotropic situations (such as anisotropy variations, directions and transitions) in a manner that is superior to that. This new method for characterizing and displaying anisotropy using cross-dipole sonic data has broad applications for formation characterization, such as identifying stress and fracture locations and direction along the borehole.

Figure 6:
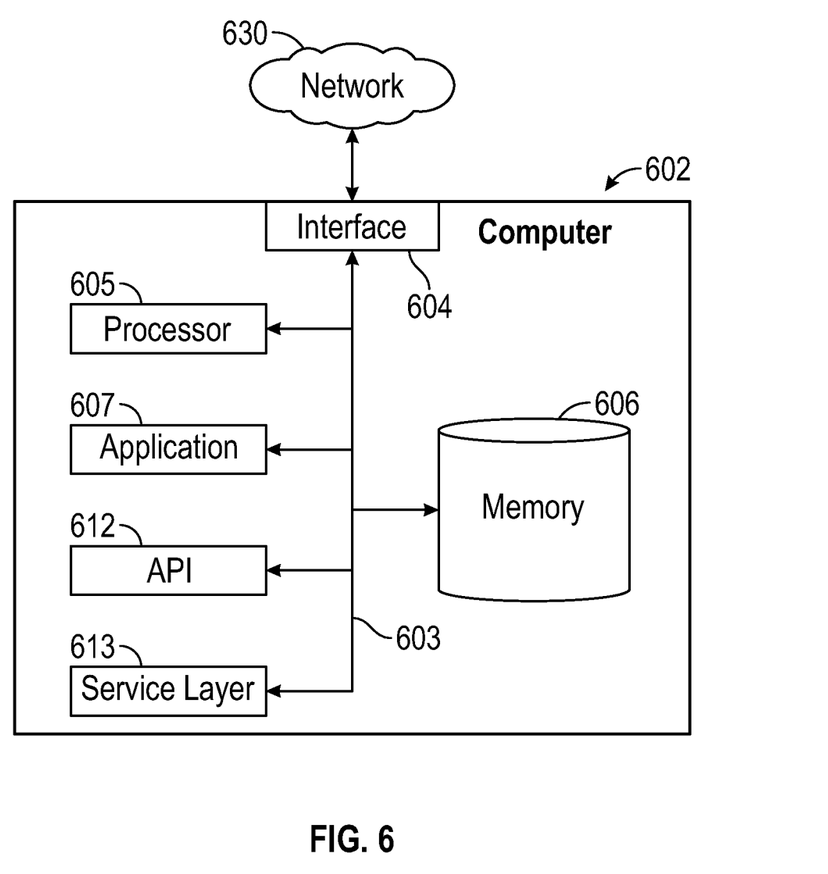
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of realizing an shear wave propagation velocity anisotropy characterization within a display for a wellbore region comprising:
   obtaining a shear wave propagation velocity anisotropy intensity, and a shear wave propagation velocity anisotropy azimuth;
   determining a directional line segment to represent the anisotropy for each of a plurality of measured depth points along the wellbore; and
   plotting on the display a plurality of directional line segments to produce a 1-dimensional anisotropy characterization plot.

2. The method of claim 1,
   wherein the shear wave propagation velocity anisotropy intensity, and the shear wave propagation velocity anisotropy azimuth are obtained from cross-dipole sonic data.

3. The method of claim 1,
wherein the shear wave propagation velocity anisotropy intensity is obtained from a difference in a propagation velocity of a fast shear wave and a propagation velocity of a slow shear wave.

4. The method of claim 1,
wherein the shear wave propagation velocity anisotropy azimuth is obtained from an orientation of a polarization of a shear wave.

5. The method of claim 1,
wherein the length of the directional line segment is a monotonic function of the anisotropic intensity.

6. The method of claim 5,
wherein the length of the directional line segment is proportional to the anisotropic intensity.

7. The method of claim 1,
wherein the directional line segment extends equally to either side of a point on the display designated as indicating zero anisotropic intensity.

8. The method of claim 1,
wherein the directional line segment begins at a point on the display designated as indicating zero anisotropic intensity.

9. The method of claim 1,
wherein the orientation of the directional line segment measured with respect to the depth axis of the display is equal to the anisotropy azimuth measured with respect to a fixed direction on the earth.

10. The method of claim 9,
wherein the fixed direction on the earth is selected from the group consisting of true North and magnetic North.

11. The method of claim 1,
wherein plotting the plurality of directional line segments, further comprises plotting line segments for every anisotropy intensity and anisotropic azimuth.

12. The method of claim 1,
wherein plotting the plurality of directional line segments, further comprises plotting line segments for a subset of the plurality of the anisotropy intensities and anisotropy azimuths.

13. A non-transitory computer readable medium storing instructions executable by a computer processor, the instructions comprising functionality for:
obtaining an shear wave propagation velocity anisotropy intensity, and an shear wave propagation velocity anisotropy azimuth;
determining a directional line segment to represent the anisotropy for each of a plurality of measured depth points along the wellbore; and
plotting on the display, by the computer processor, a plurality of directional line segments to produce an anisotropy characterization plot.

14. The non-transitory computer readable medium of claim 13, wherein the instructions further comprise functionality for:
obtaining the shear wave propagation velocity anisotropy intensity, and the shear wave propagation velocity anisotropy azimuth from cross-dipole sonic data.

15. The non-transitory computer readable medium of claim 13, wherein the instructions further comprise functionality for:
obtaining the shear wave propagation velocity anisotropy intensity from a difference in a propagation velocity of a fast shear wave and a propagation velocity of a slow shear wave.

16. The non-transitory computer readable medium of claim 13, wherein the instructions further comprise functionality for:
obtaining the shear wave propagation velocity anisotropy azimuth from an orientation of a polarization of a shear wave.

17. The non-transitory computer readable medium of claim 13, wherein the instructions further comprise functionality for:
determining the length of the directional line segment as a monotonic function of the anisotropic intensity.

18. The non-transitory computer readable medium of claim 13, wherein the instructions further comprise functionality for:
determining the length of the directional line segment as proportional to the anisotropic intensity.

19. The non-transitory computer readable medium of claim 13, wherein the instructions further comprise functionality for:
determining the orientation of the directional line segment measured with respect to the depth axis of the display equal to the anisotropy azimuth measured with respect to a fixed direction on the earth.

20. The non-transitory computer readable medium of claim 19, wherein the instructions further comprise functionality for:
selecting the fixed direction on the earth selected from the group consisting of true North, and magnetic North.

* * * * *